R. BAGGALEY.
METHOD OF RECOVERING VALUES FROM FLUE DUST AND FINES.
APPLICATION FILED OCT. 30, 1906.
900,467.
Patented Oct. 6, 1908.
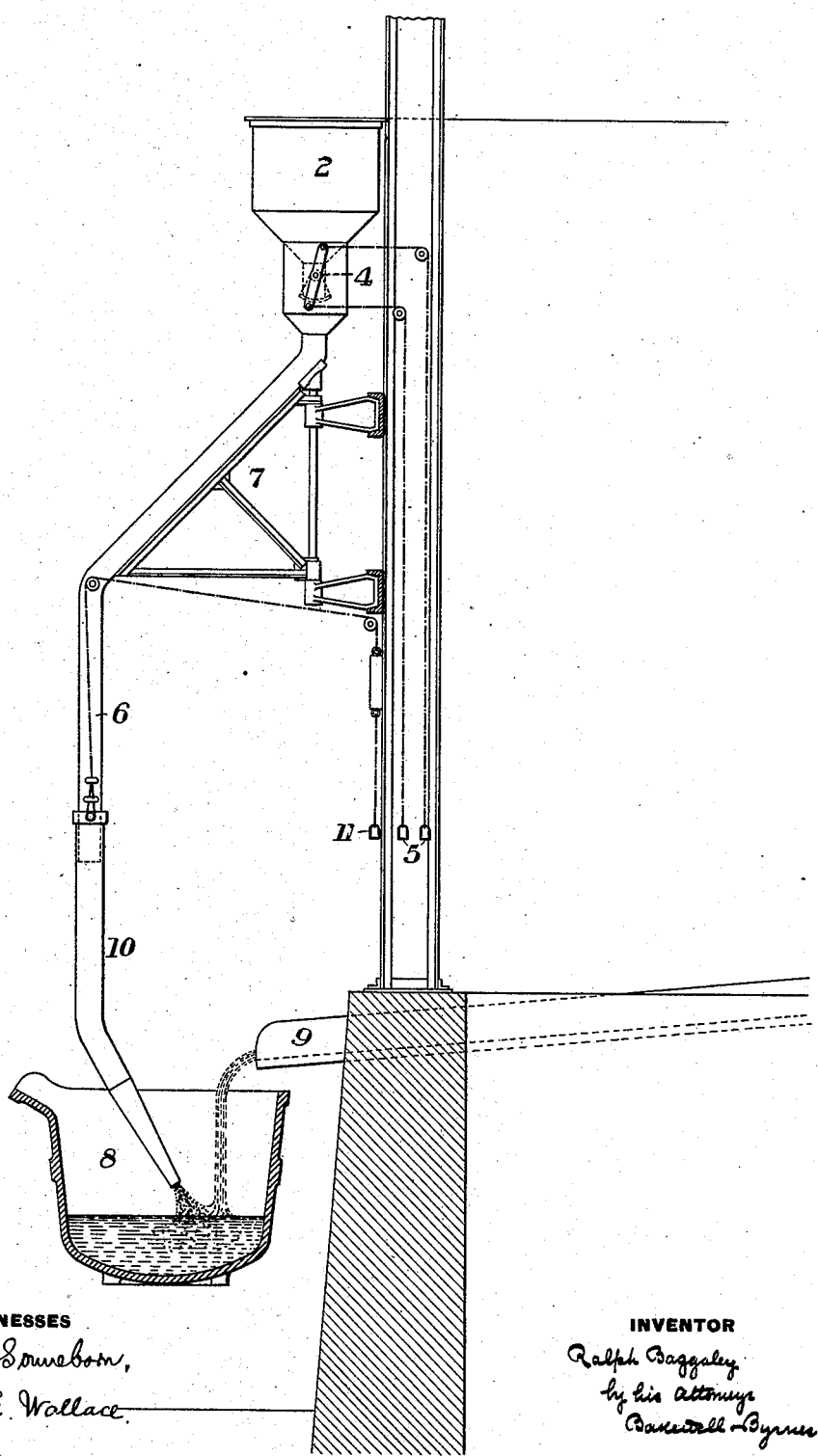

UNITED STATES PATENT OFFICE.

RALPH BAGGALEY, OF PITTSBURG, PENNSYLVANIA.

METHOD OF RECOVERING VALUES FROM FLUE-DUST AND FINES.

No. 900,467.               Specification of Letters Patent.            Patented Oct. 6, 1908.

Application filed October 30, 1906. Serial No. 341,337.

*To all whom it may concern:*

Be it known that I, RALPH BAGGALEY, of Pittsburg, Allegheny county, Pennsylvania, have invented a new and useful Method of Recovering Values from Flue-Dust and Fines, of which the following is a description, reference being had to the accompanying drawing, which illustrates my preferred form of apparatus for practicing my invention, although other apparatus may be used if desired or the work may be done by hand.

A troublesome problem in the operation of any copper smelting plant, at present, is to successfully extract the mineral values contained in flue dust and fines. The present method of treating flue dust or fines recovered from settling tanks or ponds, consists usually of mingling them with some bonding agent and briqueting them in special machinery, or molding them into bricks and thereafter baking the briquets or bricks in furnaces. When thus baked or dried, the briquets or bricks are fed into a blast furnace, usually accompanied with ore, and in the blast furnace they travel slowly downwards, becoming hotter until they finally reach a red heat, before the smelting zone has been reached, where alone they can be melted. As soon as such briquets or handmade bricks have become cherry red in the furnace, the bonding agent is destroyed, they crumble again into dust and in this form a very large proportion of their total mass is driven out of the stack by the violent blast, when they again find lodgment in the dust chambers, are again briqueted and are again subjected to the futile effort to compel them to yield up their values in a blast furnace. The physical condition of some ores is such that they cannot be mined without reducing them practically to the consistency of sand. This is notably the case in many of the sulfid deposits in Utah. When an attempt is made to smelt such in a blast furnace the percentage of loss through the action of the blast is very great. In an effort to correct this and to reduce these finely comminuted sulfids to a suitable form for smelting, without the losses above described and without their packing in the furnace like sand so as to retard the smelting process, they have sometimes been partially fused, partly or entirely through the medium of their own natural fuels, in furnaces specially constructed for the purpose, into a pasty, semi-fused mass. After the ores have reached this consistency the mass is allowed to cool in the furnace and is thereafter broken up by hand, into large lumps, in which form they constitute almost ideal material for smelting in a blast furnace. The objections to this mode of treatment are the expense for labor, the delay, and the comparatively small tonnage that it is possible to thus fuse, without an enormous investment for such special fusing furnaces.

The object of my present invention is to provide a new method of recovering the mineral values from flue dust or from fines that have been recovered from settling tanks or ponds or from finely comminuted copper, gold and silver ores. It consists in mingling all or any of these with molten matte, preferably with low grade matte.

In the process of smelting and recovering the mineral values from copper, gold and silver ores, described in United States Patents Nos. 746,241 and 746,260, dated December 8th, 1903, and in No. 766,654, dated August 2nd, 1904, I provide a first fusion solely for the elimination of silica, alumina, lime or other metalloids and without any attempt at concentration beyond what results naturally from a simple fusion of the ores. The product consists of iron, sulfur, copper, gold and silver, free from worthless metalloids. This first fusion is accomplished preferably in a smelting converter and forehearth, entirely without carbonaceous fuels when such ores are under treatment as contain natural fuels within themselves to make such a continuous smelting process without carbonaceous fuel possible. Where the ores under treatment are deficient in natural fuels, I utilize a blast furnace and forehearth for my first fusion, adding only sufficient carbonaceous fuel to supply whatever deficiency in natural fuels may exist in the ores. The matte thus produced is of low grade and usually contains from 65 to 67 per cent. of iron, and varying proportions of sulfur, and copper, gold and silver according to the percentages contained in the ores that have been treated. Such low grade matte, in the process above described, is tapped out from time to time, in suitable batches from the forehearth and placed in a basic-lined secondary converter of my process and thereafter the iron is eliminated solely by feeding into it, to whatever extent may be necessary, highly silicious, mineral-bearing ores.

In practicing my invention, I have found it convenient to utilize the apparatus illustrated in the drawing. Whenever I tap out a large ladle full of low grade matte from my forehearth, I at the same time feed directly underneath the falling stream of matte, a stream of flue dust or fines, to the extent to which the molten matte will absorb it. In this way, without expense or delay I thoroughly intermingle such flue dust or fines with the body of molten matte. Thereafter this molten matte mixed with the fines is poured into the secondary converter wherein it is bessemerized, and highly silicious ores are then fed into it for the removal of its contained iron, through the formation of silicate of iron slags.

In the drawing 2 represents a hopper containing the flue dust or fines, and controlled by a valve 4, operated by hand-pulls 5. A spout or pipe 6 is mounted preferably on a swinging frame 7 and leads to the ladle 8 into which the matte is delivered from a spout 9. The lower end of the pipe has preferably a telescopically mounted portion 10 operated by a pull 11.

Many other methods of intermingling flue dust or fines in molten matte and other modes of utilizing the mixed product will naturally suggest themselves to those skilled in the art, without departing from the spirit of my invention, since

What I claim is:

1. The method of recovering values from flue dust and fines, which consists in intermingling the flue dust or fines with molten matte to a point short of solidification, and then subjecting the mixture, while it is still in the molten state to the refining action of an oxidizing blast; substantially as described.

2. The method of recovering values from flue dust and fines, which consists in mixing the flue dust or fines with molten matte to a point short of solidification, and then subjecting the mixture, while still in a molten state, to a bessemerizing process and to the addition of silicious ores; substantially as described.

3. The herein described method of recovering flue dust and fines, which consists in intermingling the flue dust or fines with low grade matte to the extent to which the matte will absorb the dust or fines without solidification, then placing the mixture while still in a molten state in a converter and bessemerizing it and adding silicious ores for the removal of the contained iron; substantially as described.

In testimony whereof, I have hereunto set my hand.

RALPH BAGGALEY.

Witnesses:
GEORGE H. SONNEBORN,
ANNA E. WALLACE.